Patented Apr. 21, 1936

2,037,789

UNITED STATES PATENT OFFICE 2,037,789

TREATMENT OF HYDROCARBON OILS

Vladimir Ipatieff, Chicago, Ill., assignor to Universal Oil Products Company, Chicago, Ill., a corporation of Delaware No Drawing. Application April 30, 1932,
Serial No. 608,570

8 Claims. (Cl. 196—28)

This invention relates more particularly to the treatment of the lower boiling gasoline hydrocarbons produced from cracking heavy petroleum oils, though natural or uncracked gasolines produced in the primary distillation of crude petroleum or other low boiling hydrocarbon oil mixtures may also be treated.

In a more specific sense the invention has reference to a process for treating such motor fuel mixtures to reduce their sulfur content and produce other desirable refining effects.

Low boiling cracked distillates, particularly those produced by cracking high sulfur charging oils under intensive conditions, contain two classes of undesirable constituents in minor proportions. The first class comprises hydrocarbons of the character of di- and tri-olefins, which have pronounced gum-forming tendencies and also cause the development of color during storage. The second class comprises, in addition to minor amounts of hydrogen sulfide, such hydrocarbon sulfur derivatives as mercaptans, thioethers, thiophenes, thiophanes, etcetera, this class being generally objectionable on account of their bad odor and also generally on account of their corrosive tendencies either before or after combustion in the cylinders of internal combustion engines.

The relative proportions of these two undesirable classes vary considerably but in general it may be stated that both classes are always present in cracked gasolines. While a number of processes aimed at the controllable reduction by polymerization of the gum-forming materials have been successful, I am not aware of any present commercial process which is effective in selectively reducing the sulfur content of cracked distillates without undesirably affecting the unsaturated olefinic constituents. Sufficiently strong sulfuric acid treatments for reducing sulfur content cause large polymerization losses among the mono-olefins as well as among the di- and tri-olefins so that too much anti-knock material is lost. The present invention makes possible the selective and controllable reduction in sulfur content of cracked distillates by a simple process which will be described in detail in the following specification.

In one specific embodiment the invention comprises treatment of hydrocarbon oils, particularly cracked hydrocarbon oils in heated vaporous condition, with hydrogen or hydrogen-containing gases such as cracked gases, water gas, etc., in the presence of selected catalysts comprising metal oxides and aluminates.

In another specific embodiment, the invention comprises similar treatments with the hydrocarbon oils in liquid phase or partly in liquid and partly in vapor phase.

The oxides which may be employed in conjunction with aluminates as promoters in the reactions of hydrogenation comprised within the scope of the invention are those of the metals of the iron group, to-wit, iron, cobalt and nickel, and the oxides of certain metals from the second, third and fourth groups of the periodic classification of the elements. For example, zinc and cadmium from the second group, aluminum from the third group and cerium and thorium from the fourth group, may be used in the form of their oxides as base material in the catalytic mixtures. Other metals from the groups mentioned may be used insofar as they possess the proper degree of catalytic activity and insofar as their cost permits. While the oxides of these various specified metals may be used alternatively in the composite catalyst mixtures the exact effects produced by their use will not be identical.

As aluminates to be used as promoter catalysts in the mixtures those of the alkali and alkaline earth metals may be employed and also the aluminate of zinc. Aluminates may be generally considered to be salts of metaluminic acid $(HAlO_2)$, salts of this acid with the following bases having been identified as distinct compounds: Sodium, potassium, lithium, ammonium, barium, calcium, strontium, beryllium, magnesium, zinc, thallium, manganese, iron, cobalt. As a general rule the aluminates of the alkali metals are water soluble and the metallic contact masses characteristic of the invention may be produced by adding single oxides or mixtures of oxides to such solutions as will be described in the succeeding paragraph. The aluminates of the other bases named are generally relatively infusible solids and made by dry methods consisting generally in heating the proper oxides with aluminum oxide in suitable portions. The number of combinations of oxides and aluminates is quite large and, while the various combinations may be used alternatively, each will exert its own peculiar influence upon the reactions of hydrogenation so that they are not exact equivalents.

The general procedure in the preparation of such catalysts is as follows: The oxides or hydroxides of the metal or metals to be used are precipitated from solution by means of suitable reagents such, for example, as the carbonates and hydroxides of the alkali metals. The precipitates are suitably washed to remove adhering reagents and then heated at a suitable temperature for producing the oxides. The mixture of oxides is then added to the solution of an alkali metal aluminate, the solvent evaporated and the mixture of oxides and aluminates dried at temperatures of approximately 200—220° C., preferably not above the last named temperature.

While the foregoing has been given as a general procedure it will be recognized by those familiar with catalyst preparation that the steps of the procedure may be modified to suit particular cases. For example, the oxides and aluminates may be prepared separately and mixed in the relatively dry state prior to final heat treatment.

In utilizing catalysts of the present type in the treatment of hydrocarbon oils in vapor phase, they may be employed alone or in admixture with or deposited upon relatively inert silicious spacing materials or carriers, such as adsorbent earths, crushed firebrick, silica fragments, et cetera, the masses being placed in vertical cylindrical treating towers or deposited therein upon regularly spaced trays or pans over which a mixture of hydrocarbon oil vapors and hydrogen-containing gases is passed. The amount of hydrogen introduced from outside sources will depend upon the amount of free hydrogen already present in the vapors and upon the character of the hydrocarbons and particularly the form of combination of the sulfur. As a general rule the sulfur derivatives in which the sulfur atom is a member of a heterocyclic ring are the most difficultly decomposable, and larger amounts of hydrogen along with the more efficient catalysts will be necessary when the oils contain high percentages of such compounds which include thiophene and its derivatives and homologs.

When operations are conducted in liquid or liquid-vapor phase suitably modified apparatus may be employed for effecting the proper contact between the catalyst masses, the oils and the hydrogen-containing gases.

It is a feature of the present invention that when employing catalysts of the type disclosed that relatively low temperatures and pressures are sufficient to effect a large amount of sulfur reduction. For example, temperatures of from 250 to 300° C. are sufficient and pressures of atmospheric or moderately superatmospheric, such as, for example, up to 100 pounds per square inch. However, when dealing with refractory stocks, it may be of greatest advantage to employ superatmospheric pressures of a high order such as, for example, 1000 to 2000 pounds per square inch and such pressures may be employed without departing from the scope of the invention.

After a certain definite period in the case of any particular catalyst, a certain fatigue becomes manifest due to the formation of metal sulfides which as a general rule have less catalytic activity than the original catalyst. At such times the original activity may be restored by oxidation with air at temperatures from 300 to 450° C., metal sulfites or sulfates formed being washed from the mass by water, (which may or may not remove a certain amount of the aluminate), and the extracted material suitably treated to reproduce oxides which are then available for use in the making of fresh catalytic contact materials. The type of treatment employed for the restoration of catalytic activity will be dependent upon the chemical nature of the compounds involved.

Numerous examples can be given of the refining effects obtained by using particular catalyst mixtures comprised within the scope of the invention in the refining of cracked and straight run distillates, but the following are sufficiently indicative to show the improved results which were obtained in these cases.

In one instance a California cracked distillate containing 0.45% sulfur and having an end point of 437° F. was vaporized, mixed with a small quantity of hydrogen and passed through a catalyst bed consisting of 80% nickel oxide and 20% aluminum oxide. The temperature employed was 653° F. and the pressure approximately 400 pounds per square inch. The sulfur in the recovered distillate after condensation of the vapors from this treatment was 0.14% and the catalyst consumption was 2.8 pounds per barrel of desulfurized distillate.

In another test using the same distillate and a catalyst mixture of the same composition, substantially atmospheric pressure was employed with a correspondingly lower temperature of about 275° F. and in this case the sulfur reduction was slightly greater as the recovered gasoline distillate had a sulfur content of 0.09%, thus indicating improved results at the lower pressure in this particular case.

In further tests in connection with the same distillate mentioned in the preceding examples, a catalyst consisting of 84% nickel oxide and 16% sodium aluminate was employed, the temperature being approximately 600° F. and the pressure substantially atmospheric. The sulfur in the recovered gasoline was reduced to 0.12% and the catalyst consumption was 4.6 pounds per barrel of desulfurized product.

Each catalyst mixture which may be employed within the scope of the invention will accelerate the reactions of desulfurization to an extent depending on its particular composition, its mode of preparation, the type of distillate vapors undergoing treatment and other operating conditions and while various catalyst mixtures may be employed alternatively, their effects are not exactly equivalent. In some cases different catalyst mixtures may be employed successively with the less efficient being used in the primary stages while the more efficient which are usually also more sensitive are reserved for the final stages of treatment.

The amount of hydrogen necessary is relatively small and the gas from the process may be recycled after removal of hydrogen sulfide by caustic soda or other reagents, even though a considerable percentage of light paraffinic hydrocarbons are still present.

The foregoing specification and examples have disclosed and illustrated the invention, but since it is of generally wide application and the number of examples of results obtainable by its use might be multiplied greatly neither is to be used to impose undue limitations upon its generally broad scope.

I claim as my invention:

1. In the desulphurization of hydrocarbon oils by treatment with hydrogen, the improvement which comprises reacting the hydrogen with sulphur compounds contained in the oil in the presence of a metal oxide and an aluminate.

2. In the desulphurization of hydrocarbon oils by treatment with hydrogen, the improvement which comprises reacting the hydrogen with sulphur compounds contained in the oil in the presence of an aluminate and an oxide of a metal of the iron group of the periodic system.

3. In the desulphurization of hydrocarbon oils by treatment with hydrogen, the improvement which comprises reacting the hydrogen with sulphur compounds contained in the oil in the presence of cobalt oxide and an aluminate.

4. In the desulphurization of hydrocarbon oils by treatment with hydrogen, the improvement which comprises reacting the hydrogen with sulphur compounds contained in the oil in the presence of an aluminate and an oxide of a metal of the second group of the periodic system.

5. In the desulphurization of hydrocarbon oils by treatment with hydrogen, the improvement which comprises reacting the hydrogen with sulphur compounds contained in the oil in the presence of an aluminate and an oxide of a metal of the third group of the periodic system.

6. In the desulphurization of hydrocarbon oils by treatment with hydrogen, the improvement which comprises reacting the hydrogen with sulphur compounds contained in the oil in the presence of a zinc oxide and an aluminate.

7. In the desulphurization of hydrocarbon oils by treatment with hydrogen, the improvement which comprises reacting the hydrogen with sulphur compounds contained in the oil in the presence of a metal oxide and sodium aluminate.

8. A process for desulphurizing hydrocarbon oils which comprises treating the oil in vapor phase with hydrogen in the presence of a metal oxide and an aluminate at temperatures sufficient to react the hydrogen with sulphur compounds contained in the oil.

VLADIMIR IPATIEFF.